US006983248B1

(12) United States Patent
Tahara et al.

(10) Patent No.: US 6,983,248 B1
(45) Date of Patent: Jan. 3, 2006

(54) METHODS AND APPARATUS FOR RECOGNIZED WORD REGISTRATION IN ACCORDANCE WITH SPEECH RECOGNITION

(75) Inventors: Yoshinori Tahara, Kanagawa (JP); Norikazu Ichikawa, Kanagawa (JP); Daisuke Tomoda, Yokohama (JP); Tetsuya Uda, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 09/656,964

(22) Filed: Sep. 7, 2000

(30) Foreign Application Priority Data

Sep. 10, 1999 (JP) ................................ 11-257429

(51) Int. Cl.
*G10L 15/28* (2006.01)
(52) U.S. Cl. ...................................... 704/255
(58) Field of Classification Search ............... 704/255, 704/231, 251, 254
See application file for complete search history.

(56) References Cited

U.S. PATENT DOCUMENTS

| | | | | |
|---|---|---|---|---|
| 4,507,750 A | * | 3/1985 | Frantz et al. ............... | 704/231 |
| 4,749,353 A | * | 6/1988 | Breedlove .................. | 704/270 |
| 4,914,704 A | * | 4/1990 | Cole et al. ................. | 704/235 |
| 5,208,897 A | * | 5/1993 | Hutchins .................... | 704/231 |
| 6,018,736 A | * | 1/2000 | Gilai et al. ..................... | 707/6 |
| 6,208,964 B1 | * | 3/2001 | Sabourin .................... | 704/244 |
| 6,230,131 B1 | * | 5/2001 | Kuhn et al. ................. | 704/266 |
| 6,233,553 B1 | * | 5/2001 | Contolini et al. ........... | 704/220 |
| 6,363,342 B2 | * | 3/2002 | Shaw et al. ................ | 704/220 |
| 6,411,932 B1 | * | 6/2002 | Molnar et al. .............. | 704/260 |

(Continued)

FOREIGN PATENT DOCUMENTS

| | | |
|---|---|---|
| JP | 59-7998 | 1/1984 |
| JP | 59-107397 | 6/1984 |
| JP | 60-63900 | 5/1985 |
| JP | 62-255999 | 11/1987 |
| JP | 11-231886 | 8/1999 |
| JP | 2001-022374 | 1/2001 |

OTHER PUBLICATIONS

IBM TDB, "Using Aletrnate Spellings to Generate Baseforms", Jun. 1, 1992, IBM Technical Disclosure Bulletin, Jun. 1992; vol. 35, Iss. 1A, pp 59.*

(Continued)

*Primary Examiner*—Vijay Chawan
*Assistant Examiner*—Michael N. Opsasnick
(74) *Attorney, Agent, or Firm*—Ryan, Mason & Lewis, LLP

(57) ABSTRACT

A sounds-like spelling group is generated in which scores are used for word descriptions. A user selects a correct sounds-like spelling from a generated sounds-like spelling group, and a group of base forms is generated with scores provided for the selected sounds-like spelling and the reading of the word. In this fashion, a base form having a score that exceeds a reference value is registered without a voice recording being required. During the speech recognition process as performed by a user, when a predetermined error state is detected, e.g., when the number of recognition errors exceeds N, a panel is output requesting that the user register the inscription, the sounds-like spelling and the pronunciation inscription for the word and that the user record a corresponding pronunciation. In accordance with the pronunciation provided by the user, the base form is obtained and is re-registered in the speech recognition dictionary.

12 Claims, 11 Drawing Sheets

U.S. PATENT DOCUMENTS

| | | | | |
|---|---|---|---|---|
| 6,490,561 B1 * | 12/2002 | Wilson et al. | ............... | 704/251 |
| 6,511,324 B1 * | 1/2003 | Wasowicz | ................... | 434/167 |
| 6,556,973 B1 * | 4/2003 | Lewin | ........................ | 704/277 |
| 6,581,033 B1 * | 6/2003 | Reynar et al. | .............. | 704/231 |
| 6,585,517 B2 * | 7/2003 | Wasowicz | ................... | 434/167 |
| 2003/0229497 A1 * | 12/2003 | Wilson et al. | ........... | 704/270.1 |

OTHER PUBLICATIONS

K. Takagi et al., "Language Modeling and Topic Extraction for Broadcast News," The Institute of Electronics, Information and Communication Engineers, Technical Report of IEICE, SP98-33, pp. 73-80, Jun. 1998.

* cited by examiner

| WORD INSCRIPTION | | |
|---|---|---|
| 田原 | | |
| SOUNDS-LIKE SPELLING | PRONUNCIATION INSCRIPTION | SOUNDS-LIKE SPELLING SCORE |
| たはら | tahara | 0.83 |
| たわら | tawara | 0.56 |
| たばら | tabara | 0.45 |
| たばる | tabaru | 0.20 |
| だはら | dahara | 0.02 |

METHODS AND APPARATUS FOR RECOGNIZED WORD REGISTRATION IN ACCORDANCE WITH SPEECH RECOGNITION

FIELD OF THE INVENTION

The present invention relates to a method for customizing a speech recognition dictionary, and in particular to a speech recognition dictionary customizing method whereby the procedures required of a user when registering words in a speech recognition dictionary are reduced.

BACKGROUND OF THE INVENTION

Conventionally, for speech recognition performed for a specific language, such as Japanese, when a user registers a word that can be identified, for the word inscription,
1. the sounds-like spelling of the word (includes use of Kanji and alphabetical characters) is entered; and
2. a plurality of base forms (pronunciations) expected from the sounds-like spelling are compared with the user's pronunciation of the word, and the base form receiving the highest evaluation, one exceeding a predetermined threshold value, is adopted and is registered in the speech recognition dictionary.

In order to reduce the work that is required for a user during the registration phase, the key strokes used for a kana/kanji entry may be obtained to reduce the labor required to input the sounds-like spelling. However, when kana/kanji is not employed, or when, as in an English word, the sounds-like spelling can not be conveyed by entering a key stroke, the above method can not be used.

Further, in many cases in Japanese, the reading (of kana) does not have a one to one correspondence with the pronunciation, and if base forms are not selected in accordance with information acquired from the actual pronunciation of words, a high speech recognition accuracy can not be maintained. For example, in Japanese, a plurality of pronunciations may be applied for a single reading. In English, such readings do not exist, but when the spelling is used as a replacement for Japanese reading, the word "vase," for example, has two pronunciations: "va-z" and "veis." As another example, a different base form must be prepared even for the same sounds-like spelling; Chinese characters coded 312 of FIG. 6 mean a calf and Chinese characters coded 314 of FIG. 6 mean a lecturer. Both of them can be shown the same reading by printing "Kana" 316. However, a pronunciation of 312 is "koushi" but a pronunciation of 314 is "koo:shi."

As is shown in FIGS. 13 and 14, according to conventional speech recognition software, a word 501 to be registered is specified, the sounds-like spelling and pronunciation of the word 501 are entered in fields 507 and 509 of an input panel 500, and the actual pronunciation of the word 501 is thereafter obtained while a recording button 503 is depressed. In this manner, for speech recognition, the word is registered in a speech recognition dictionary.

The voice information that is entered is compared with each of a plurality of corresponding sounds-like spellings, and a check is performed to determine whether the value of the highest evaluation for a base form exceeds a predetermined threshold value. If the value of the highest evaluation for the base form exceeds the predetermined threshold value, the pertinent base form is registered in the speech recognition dictionary, with the word 501, the sounds-like spelling 507 and the pronunciation 509.

When the value of the highest evaluation for the base form does not exceed the predetermined threshold value, a panel 520 is displayed that requests a user to again enter the pronunciation of the word 501, and based on the voice information that is input, another check is performed to determine whether the value of the evaluation for the pertinent base form exceeds the predetermined threshold value. This process must be repeated until the value of the evaluation for the pertinent base form exceeds the predetermined threshold value, and this is the source of much trouble for a user.

SUMMARY OF THE INVENTION

It is, therefore, one object of the present invention to provide a speech recognition system that can maintain speech recognition accuracy when a new word is being registered in a speech recognition dictionary, and that can reduce, to the greatest extent possible, the work associated with the recording of a user's voice.

It is another object of the present invention to provide a speech recognition system that can reduce, to the extent possible and in order to limit the resources that are required, the amount of information that is needed when a user's voice is registered.

It is an additional object of the present invention to provide a speech recognition system that is easy to use and that enables a user to intuitively understand an obtained result.

A sounds-like spelling group is generated in which scores are used for word descriptions. A user selects a correct sounds-like spelling from a generated sounds-like spelling group, and a group of base forms is generated with scores provided for the selected sounds-like spelling and the reading of the word. In this fashion, a base form having a score that exceeds a reference value is registered without a voice recording being required. During the speech recognition process as performed by a user, when a predetermined error state is detected, e.g., when the number of recognition errors exceeds N, a panel is output requesting that the user register the inscription, the sounds-like spelling and the pronunciation inscription for the word and that the user record a corresponding pronunciation. In accordance with the pronunciation provided by the user, the base form is obtained and is re-registered in the speech recognition dictionary.

According to one aspect of the present invention, provided is a recognized word registration method, for a speech recognition apparatus that includes a display screen and a voice input device, comprises the steps of:
(a) obtaining a word inscription specified by a user;
(b) searching a word dictionary to obtain a sounds-like spelling corresponding to the word inscription;
(c) searching a pronunciation dictionary to obtain a base form corresponding to the sounds-like spelling that has been obtained; and
(d) registering the base form in a speech recognition dictionary.

According to one more aspect of the present invention, provided is a recognized word registration method, for a speech recognition apparatus that includes a display screen and a voice input device, comprises the steps of:
(a) obtaining a word inscription specified by a user;
(b) searching a word dictionary to obtain a plurality of sounds-like spellings that correspond to the word inscription and sounds-like spelling scores that correspond to the sounds-like spellings;

(c) displaying the plurality of sounds-like spellings for the user;

(d) obtaining the sounds-like spelling that is selected by the user from among the plurality of sounds-like spellings;

(e) searching a pronunciation dictionary to obtain a base form and a pronunciation score corresponding to the sounds-like spelling that has been obtained;

(f) determining whether the pronunciation score exceeds a predetermined threshold value; and (g) registering the base form in a speech recognition dictionary when the pronunciation score exceeds the predetermined threshold value.

According to another aspect of the present invention, provided is a recognized word registration method, for a speech recognition apparatus that includes a display screen and a voice input device, comprises the steps of:

(a) determining whether first voice information obtained for a user's voice matches a predetermined condition;

(b) displaying on the display screen, when the voice information matches the predetermined condition, a speech recognition wizard panel that includes a new word input field and a sounds-like spelling input field;

(c) obtaining a new word and a sounds-like spelling that are entered in the speech recognition wizard panel;

(d) obtaining second voice information based on the user's pronunciation provided for the new word and the sounds-like spelling;

(e) employing the second voice information, the new word and the sounds-like spelling to specifically describe a base form; and (f) adding the base form to a speech recognition dictionary.

According to an additional aspect of the present invention, provided is a recognized word registration method, for a speech recognition apparatus that includes a display screen and a voice input device, comprises:

an initial registration step, including (a1) obtaining a word inscription specified by a user, (a2) searching a word dictionary to obtain a plurality of sounds-like spellings that correspond to the word inscription and sounds-like spelling scores that correspond to the sounds-like spellings, (a3) displaying the plurality of sounds-like spellings for the user, (a4) obtaining the sounds-like spelling that is selected by the user from among the plurality of sounds-like spellings, (a5) searching a pronunciation dictionary to obtain a base form and a pronunciation score corresponding to the sounds-like spelling that has been obtained, (a6) determining whether the pronunciation score exceeds a predetermined threshold value, and (a7) registering the base form in a speech recognition dictionary when the pronunciation score exceeds the predetermined threshold value; and a registration step at the speech recognition time, including (b1) determining whether first voice information obtained for a user's voice matches a predetermined condition, (b2) displaying on the display screen, when the voice information matches the predetermined condition, a speech recognition wizard panel that includes a new word input field and a sounds-like spelling input field, (b3) obtaining a new word and a sounds-like spelling that are entered in the speech recognition wizard panel, (b4) obtaining second voice information based on the user's pronunciation provided for the new word and the sounds-like spelling, (b5) employing the second voice information, the new word and the sounds-like spelling to specifically describe a second base form, and (b6) adding the second base form to a speech recognition dictionary.

According to a further aspect of the present invention, provided is a speech recognition apparatus, which includes a display screen and a voice input device, comprises:

(a) a recognized word registration unit for obtaining a word inscription specified by a user;

(b) a sounds-like spelling generator for searching a word dictionary to obtain a sounds-like spelling corresponding to the word inscription;

(c) a base form generator for searching a pronunciation dictionary to obtain a base form corresponding to the sounds-like spelling that has been obtained; and (d) a speech recognition dictionary in which the base form is registered.

According to one further aspect of the present invention, provided is a speech recognition apparatus, which includes a display screen and a voice input device, comprises:

(a) a recognized word registration unit for obtaining a word inscription specified by a user;

(b) a sounds-like spelling generator for searching a word dictionary to obtain a plurality of sounds-like spellings that correspond to the word inscription and sounds-like spelling scores that correspond to the sounds-like spellings, and for obtaining the sounds-like spelling that is selected by the user from among the plurality of sounds-like spellings on the display screen;

(c) a base form generator for searching a pronunciation dictionary to obtain a base form and a pronunciation score corresponding to the sounds-like spelling that has been obtained; and (d) a speech recognition dictionary in which the base form is registered when the pronunciation score exceeds a predetermined threshold value.

According to yet one more aspect of the present invention, provided is a speech recognition apparatus, which includes a display screen and a voice input device, comprises:

(a) a recognized word registration unit for determining whether first voice information obtained for a user's voice matches a predetermined condition;

(b) a speech recognition wizard for displaying on the display screen, when the voice information matches the predetermined condition, a speech recognition wizard panel that includes a new word input field and a sounds-like spelling input field;

(c) a voice input unit for obtaining second voice information based on the user's pronunciation provided for a new word and a sounds-like spelling that are entered in the speech recognition wizard panel;

(d) a base form generator for employing the second voice information, the new word and the sounds-like spelling to specifically describe a base form; and (e) a speech recognition dictionary to which the base form is added.

According to yet another aspect of the present invention, provided is a speech recognition apparatus comprises:

(a) a display screen;

(b) a voice input unit for entering voice information generated by a user's voice;

(c) a speech recognition engine for recognizing the voice information;

(d) a recognized word registration unit for obtaining a word inscription specified by a user;

(e) a sounds-like spelling generator for searching a word dictionary to obtain a plurality of sounds-like spellings that correspond to the word inscription and sounds-like spelling scores that correspond to the sounds-like spellings, and for, when one of the plurality of sounds-like spellings is selected by the user, obtaining the sounds-like spelling that is selected;

(f) a base form generator for searching a pronunciation dictionary to obtain a base form and a pronunciation score corresponding to the sounds-like spelling that has been obtained; and (g) a speech recognition dictionary in which a base form is registered when the pronunciation score exceeds the predetermined threshold value, (c2) wherein the speech recognition engine determines whether first voice information obtained for a user's voice matches a predetermined condition, and activates, when the voice information matches the predetermined condition, a speech recognition wizard panel that includes a new word input field and a sounds-like spelling input field, (d2) wherein the sounds-like spelling generator obtains second voice information based on the user's pronunciation provided for a new word and a sounds-like spelling that are entered in the speech recognition wizard panel;

(e2) wherein the base form generator employs the second voice information, the new word and the sounds-like spelling to specifically describe a second base form; and (f2) wherein the second base form is stored in the speech recognition dictionary.

According to yet an additional aspect of the present invention, provided is a storage medium on which is stored a recognized word registration program that is to be executed by a speech recognition apparatus that includes a display screen and a voice input device, the recognized word registration program comprising:

(a) program code for instructing the speech recognition apparatus to obtain a word inscription specified by a user;

(b) program code for instructing the speech recognition apparatus to search a word dictionary to obtain a sounds-like spelling corresponding to the word inscription;

(c) program code for instructing the speech recognition apparatus to search a pronunciation dictionary to obtain a base form corresponding to the sounds-like spelling that has been obtained; and (d) program code for instructing the speech recognition apparatus to register the base form in a speech recognition dictionary.

According to yet a further aspect of the present invention, provided is a storage medium on which is stored a recognized word registration program that is to be executed by a speech recognition apparatus that includes a display screen and a voice input device, the recognized word registration program comprising:

(a) program code for instructing the speech recognition apparatus to obtain a word inscription specified by a user;

(b) program code for instructing the speech recognition apparatus to search a word dictionary to obtain a plurality of sounds-like spellings that correspond to the word inscription and sounds-like spelling scores that correspond to the sounds-like spellings;

(c) program code for instructing the speech recognition apparatus to display the plurality of sounds-like spellings for the user;

(d) program code for instructing the speech recognition apparatus to obtain the sounds-like spelling that is selected by the user from among the plurality of sounds-like spellings;

(e) program code for instructing the speech recognition apparatus to search a pronunciation dictionary to obtain a base form and a pronunciation score corresponding to the sounds-like spelling that has been obtained;

(f) program code for instructing the speech recognition apparatus to determine whether the pronunciation score exceeds a predetermined threshold value; and (g) program code for instructing the speech recognition apparatus to register the base form in a speech recognition dictionary when the pronunciation score exceeds the predetermined threshold value.

According to yet one further aspect of the present invention, provided is a storage medium on which is stored a speech recognition process program that is to be executed by a speech recognition apparatus that includes a display screen and a voice input device, the speech recognition process program comprising:

(a) program code for instructing the speech recognition apparatus to determine whether first voice information obtained for a user's voice matches a predetermined condition;

(b) program code for instructing the speech recognition apparatus to display on the display screen, when the voice information matches the predetermined condition, a speech recognition wizard panel that includes a new word input field and a sounds-like spelling input field;

(c) program code for instructing the speech recognition apparatus to obtain a new word and a sounds-like spelling that are entered in the speech recognition wizard panel;

(d) program code for instructing the speech recognition apparatus to obtain second voice information based on the user's pronunciation provided for the new word and the sounds-like spelling;

(e) program code for instructing the speech recognition apparatus to employ the second voice information, the new word and the sounds-like spelling to specifically describe a base form; and (f) program code for instructing the speech recognition apparatus to add the base form to a speech recognition dictionary.

According to yet one further aspect of the present invention, provided is a storage medium on which is stored a speech recognition process program that is to be executed by a speech recognition apparatus that includes a display screen and a voice input device, the speech recognition process program comprising:

(a) program code for instructing the speech recognition apparatus to obtain a word inscription specified by a user;

(b) program code for instructing the speech recognition apparatus to search a word dictionary to obtain a plurality of sounds-like spellings that correspond to the word inscription and sounds-like spelling scores that correspond to the sounds-like spellings;

(c) program code for instructing the speech recognition apparatus to display the plurality of sounds-like spellings for the user;

(d) program code for instructing the speech recognition apparatus to obtain the sounds-like spelling that is selected by the user from among the plurality of sounds-like spellings;

(e) program code for instructing the speech recognition apparatus to search a pronunciation dictionary to obtain a base form and a pronunciation score corresponding to the sounds-like spelling that has been obtained;

(f) program code for instructing the speech recognition apparatus to determine whether the pronunciation score exceeds a predetermined threshold value;

(g) program code for instructing the speech recognition apparatus to register the base form in a speech recognition dictionary when the pronunciation score exceeds the predetermined threshold value;

(h) program code for instructing the speech recognition apparatus to determine whether first voice information obtained for a user's voice matches a predetermined condition;

(i) program code for instructing the speech recognition apparatus to display on the display screen, when the voice information matches the predetermined condition, a speech recognition wizard panel that includes a new word input field and a sounds-like spelling input field;

(j) program code for instructing the speech recognition apparatus to obtain a new word and a sounds-like spelling that are entered in the speech recognition wizard panel;

(k) program code for instructing the speech recognition apparatus to obtain second voice information based on the user's pronunciation provided for the new word and the sounds-like spelling;

(l) program code for instructing the speech recognition apparatus to employ the second voice information, the new word and the sounds-like spelling to specifically describe a second base form; and (m) program code for instructing the speech recognition apparatus to add the second base form to a speech recognition dictionary.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

A. Speech Recognition Processing

Figure 1:
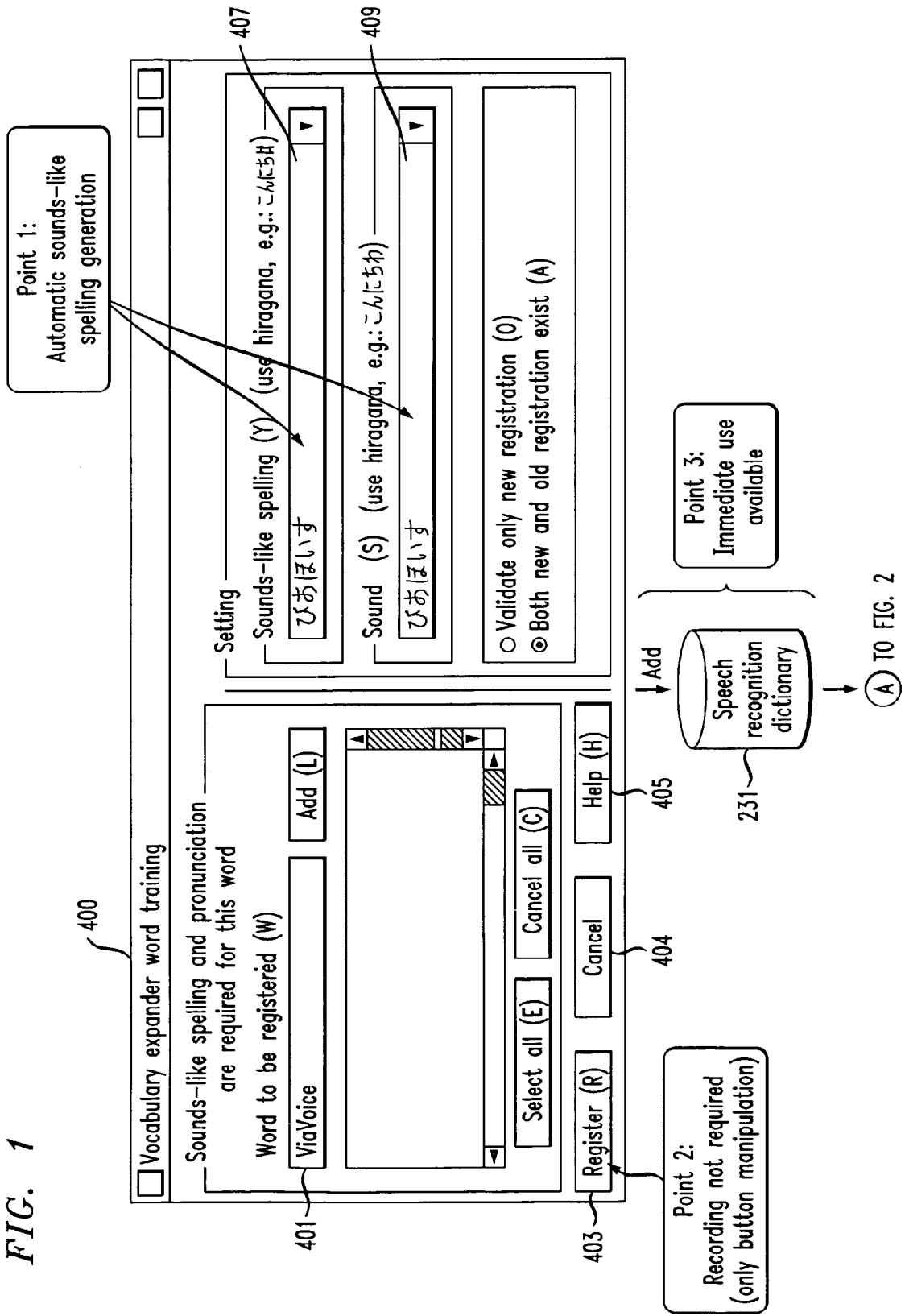
FIG. 1 is a conceptual diagram for explaining the outline of the recognized word registration processing for a preferred embodiment of the present invention.
Figure 2:
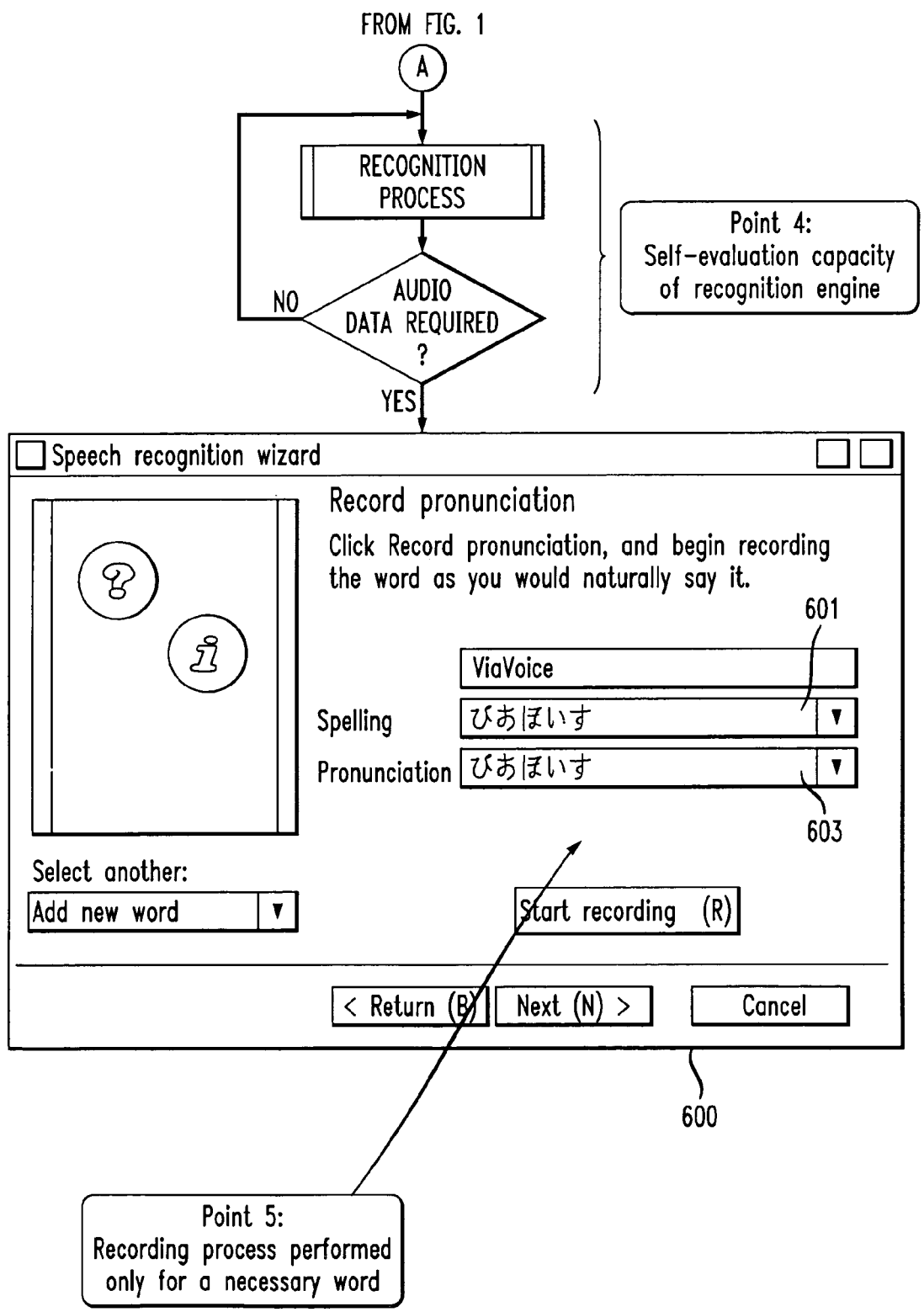
FIG. 2 is a conceptual diagram for explaining the outline of the recognized word registration processing for a preferred embodiment of the present invention.

FIGS. 1 and 2 are conceptual diagrams for explaining the outline of the speech recognition processing for a preferred embodiment of the present invention. In this embodiment, a method used for Text-To-Speech is employed to generate, from a word inscription 401, a set consisting of a sounds-like spelling group 407 and a pronunciation inscription 409 for which scores are provided. A user selects a correct sounds-like spelling from the sounds-like spelling group 407.

A base form group with accompanying scores is generated from the inscription and the sounds-like spelling, and a base form having a score that exceeds a reference value is registered in a speech recognition dictionary 231 without a voice having to be recorded.

Then, in the actual speech recognition process, when a specific error state is detected, e.g., when the number of recognition errors exceeds N, the voice of a user is recorded, and the base form as it is actually pronounced is obtained and is re-registered in the speech recognition dictionary. The re-registered base form is employed for the next speech recognition process.

B. Hardware Arrangement

Figure 3:
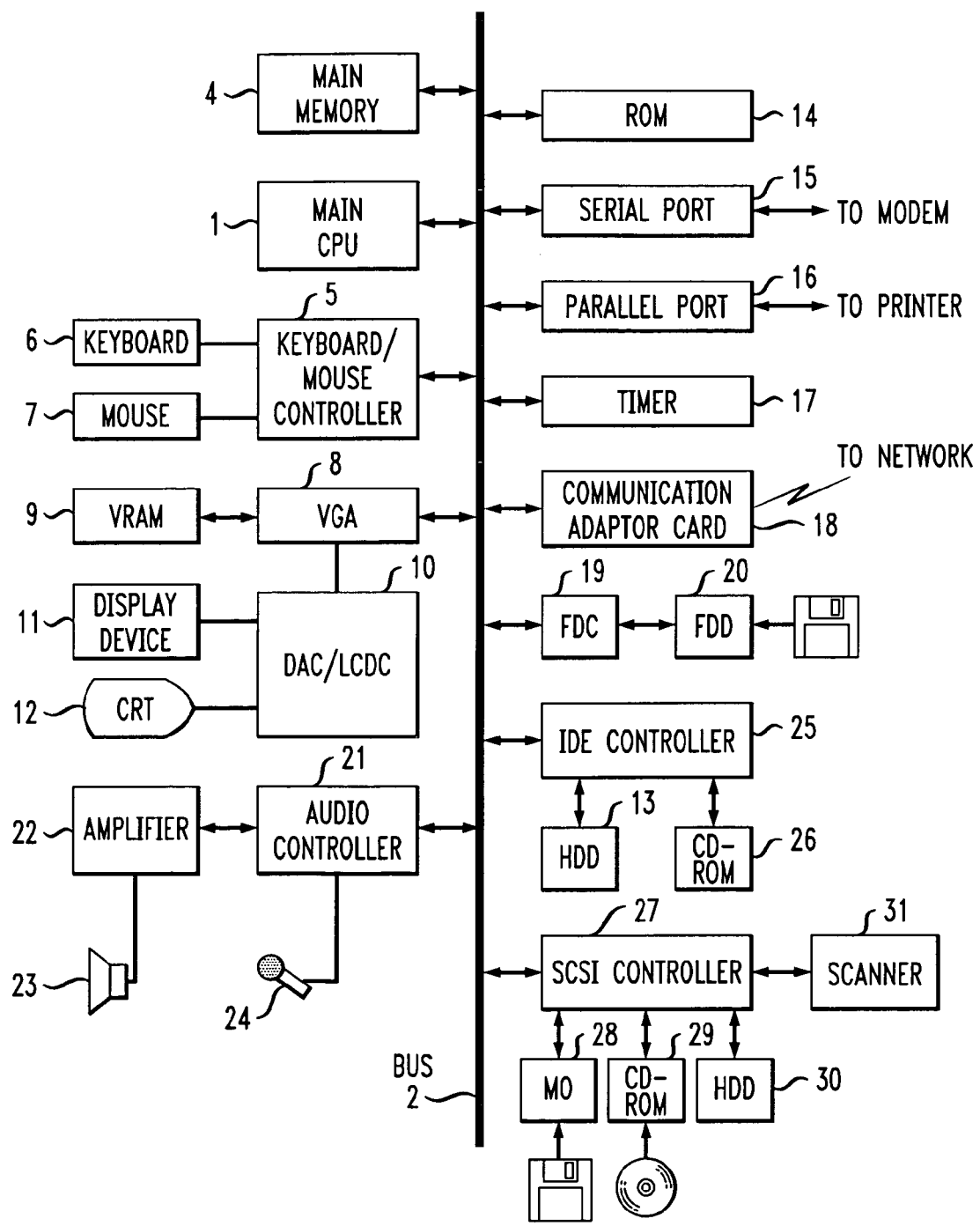
FIG. 3 is a block diagram illustrating an example hardware arrangement for a speech recognition apparatus according to the present invention.

FIG. 3 is a diagram showing a hardware arrangement for a speech recognition system 100 according to the present invention. The speech recognition system 100 comprises a central processing apparatus (CPU) 1 and a memory 4. The CPU 1 and the memory 4 are connected by a bus 2 to hard disk drives 13 and 30, which are auxiliary storage devices. A floppy disk drive 20 (or a storage medium drive 26, 28, 29 or 30, such as an MO 28 or a CD-ROM 26 or 29) is connected to the bus 2 via a floppy disk controller 19 (or an IDE controller 25 or a SCSI controller 27).

A floppy disk (or another storage medium, such as an MO or a CD disk) is inserted into the floppy disk drive 20 (or into the storage medium driver 26, 28, 29 or 30, such as an MO or a CD-ROM), and code or data is read for a computer program, which interacts with an operating system and which issues instructions to the CPU 1 for carrying out the present invention, that is stored on the floppy disk, or on the hard disk drive 13 or in a ROM 14. The code for this computer program, which is executed by loading it into the memory 4, can either be compressed or can be divided into multiple segments for storage on multiple storage mediums.

The speech recognition system 100 further comprises user interface hardware components. These user interface hardware components include a pointing device (a mouse, a joystick or a track ball) 7, for entering on-screen positioning information; a keyboard 6, for keying in data; and display devices 11 and 12, for providing visual data for a user. A loudspeaker 23 is used to receive audio signals from an audio controller 21 via an amplifier 22, and to output the signals as sound. A voice input device or microphone 24 is also provided for inputting speech.

The speech recognition system 100 of the present invention can communicate with another computer via a serial port 15 and a modem, or via a communication adapter 18, such as one for a token ring.

The present invention can be carried by a common personal computer (PC); by a workstation; by a computer incorporated in a television set, a facsimile machine or another electrical home appliance; by a computer (car navigation system, etc.) mounted in a vehicle or an airplane; or by a combination of the components described above. It should be noted, however, that these components are merely examples, and that not all of them are required for the present invention. In particular, since the present invention relates to the customizing of a speech recognition dictionary, the components, such as the serial port 15 and the parallel port 16, are not necessarily required for the present invention.

A preferable operating system for the speech recognition system 100 is one that supports a GUI multi-window environment, such as WindowsNT, Windows9x or Windows3.x (trademarks of Microsoft), OS/2 (a trademark of IBM), MacOS (a trademark of Apple Corp.), Linux (a trademark of Linus Torvalds), or the X-WINDOW system (a trademark of MIT) on AIX (a trademark of IBM); one that runs in a character-based environment, such as PC-DOS (a trademark of IBM) or MS-DOS (a trademark of Microsoft); a real-time OS, such as OS/Open (a trademark of IBM) or VxWorks (a trademark of Wind River Systems, Inc.); or an OS that is incorporated in a network computer, such as JavaOS. However, the operating system for the present invention is not specifically limited.

C. System Configuration

Figures 4, 5:
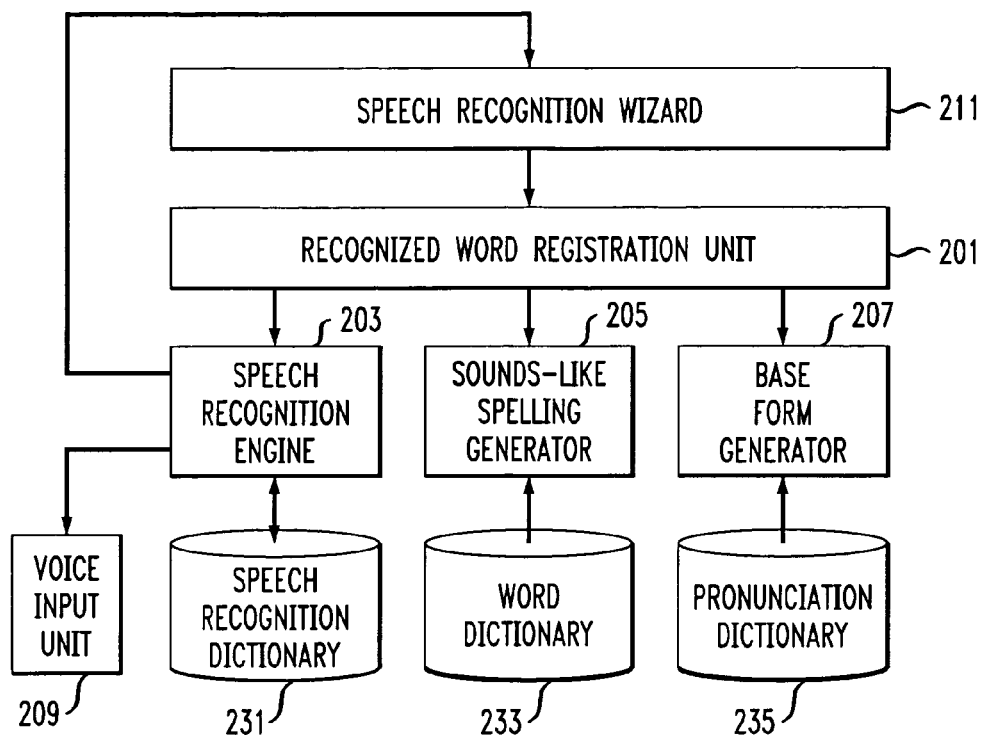
FIG. 4 is a block diagram showing the components of a speech recognition system according to an embodiment of the present invention.
FIG. 5 is a conceptual diagram showing a word dictionary according to an embodiment of the present invention.

FIG. 4 is a functional block diagram illustrating the components of a speech recognition system according to a preferred embodiment of the present invention.

The speech recognition system of this embodiment comprises: a recognized word registration unit 201, a speech recognition engine 203, a sounds-like spelling generator 205, a base form generator 207, a voice input unit 209, a speech recognition wizard 211, a speech recognition dictionary 231, a word dictionary 233, and a pronunciation dictionary 235.

The recognized word registration unit 201 interacts with an operating system to control the display of a user's entry or various information required for the word registration process in this invention. The recognized word registration unit 201 also controls the other components, including the sounds-like spelling generator 205.

The speech recognition engine 203 employs a speech recognition dictionary to analyze actual voice information that is input, and outputs text data. Further, the speech recognition engine 203 detects predetermined speech recognition errors, and activates the speech recognition wizard 211.

The sounds-like spelling generator 205 receives character description data for a word from the recognized word registration unit 201, and uses the word dictionary 233 to search for the sounds-like spelling and the score that correspond to the character description data. The sounds-like spelling generator 205 can also correct the sounds-like spelling or the score based on a predetermined logic. The sounds-like spelling and the score for a word can be set in accordance with statistic information, such as the probability of an occurrence, and an empirical value.

FIG. 5 is a conceptual diagram showing the word dictionary 233 for an embodiment of the present invention. As is shown in FIG. 5, a word inscription 301, a sounds-like spelling 303, a pronunciation inscription 305 and a sounds-like spelling score 307 are managed in the word dictionary 233.

The base form generator 207 searches the pronunciation dictionary 235 by using word inscription and sounds-like spelling information that are input, and outputs a corresponding base form and a pronunciation score. In addition, the base form generator 207 employs a predetermined logic to correct a pronunciation score. The pronunciation score can be set based on statistical information, such as the probability of an occurrence and an empirical value. A function value based on the sounds-like spelling score and the pronunciation score, such as the sounds-like spelling scorexthe pronunciation score, can be set as the score for a base form corresponding to the word inscription.

Figure 6:
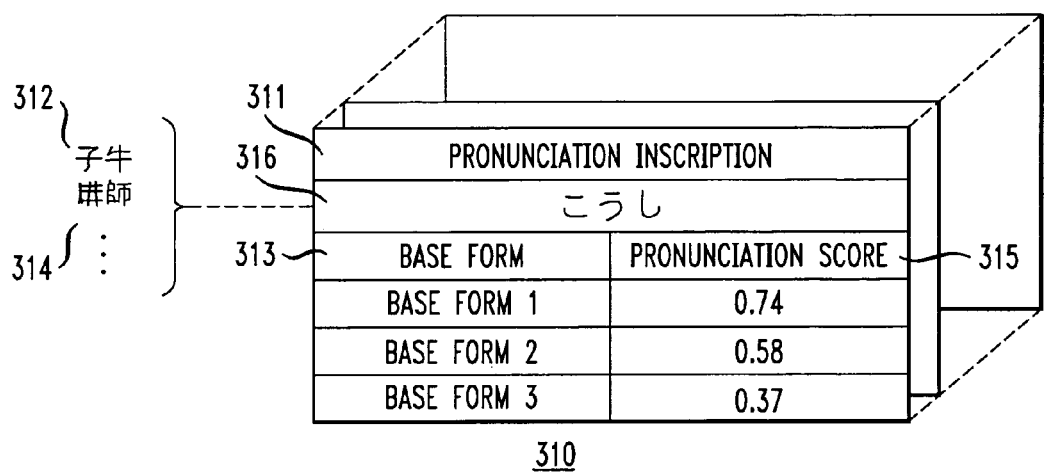
FIG. 6 is a conceptual diagram showing a pronunciation dictionary according to an embodiment of the present invention.

FIG. 6 is a conceptual diagram showing the pronunciation dictionary 235 according to an embodiment of the present invention. As is shown in FIG. 6, a pronunciation inscription 311, a base form 313 and a pronunciation score 315 are managed in the pronunciation dictionary 235.

The voice input unit 209 fetches voice information from the user into the system.

The speech recognition wizard 211 employs voice information acquired by the entry of a user's voice to determine a base form that corresponds to the word inscription.

The functional blocks in FIG. 4 have been explained. These functional blocks are logical blocks. This does not mean that they must each be implemented by a hardware unit or a software unit; rather, they can be implemented by employing a combination composed of common hardware and software.

D. Word Registration Processing

Figure 7:
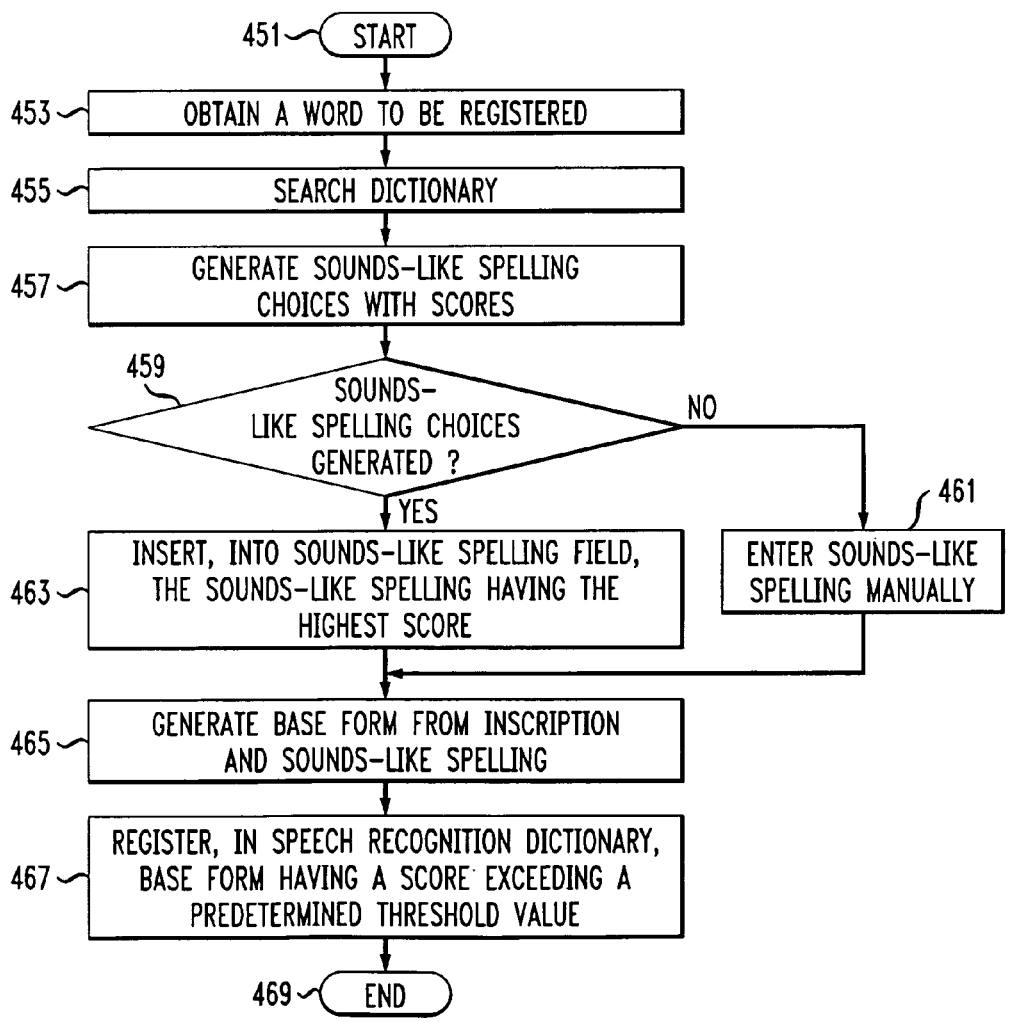
FIG. 7 is a flowchart showing the recognized word registration processing performed for an embodiment of the present invention.
Figure 8:
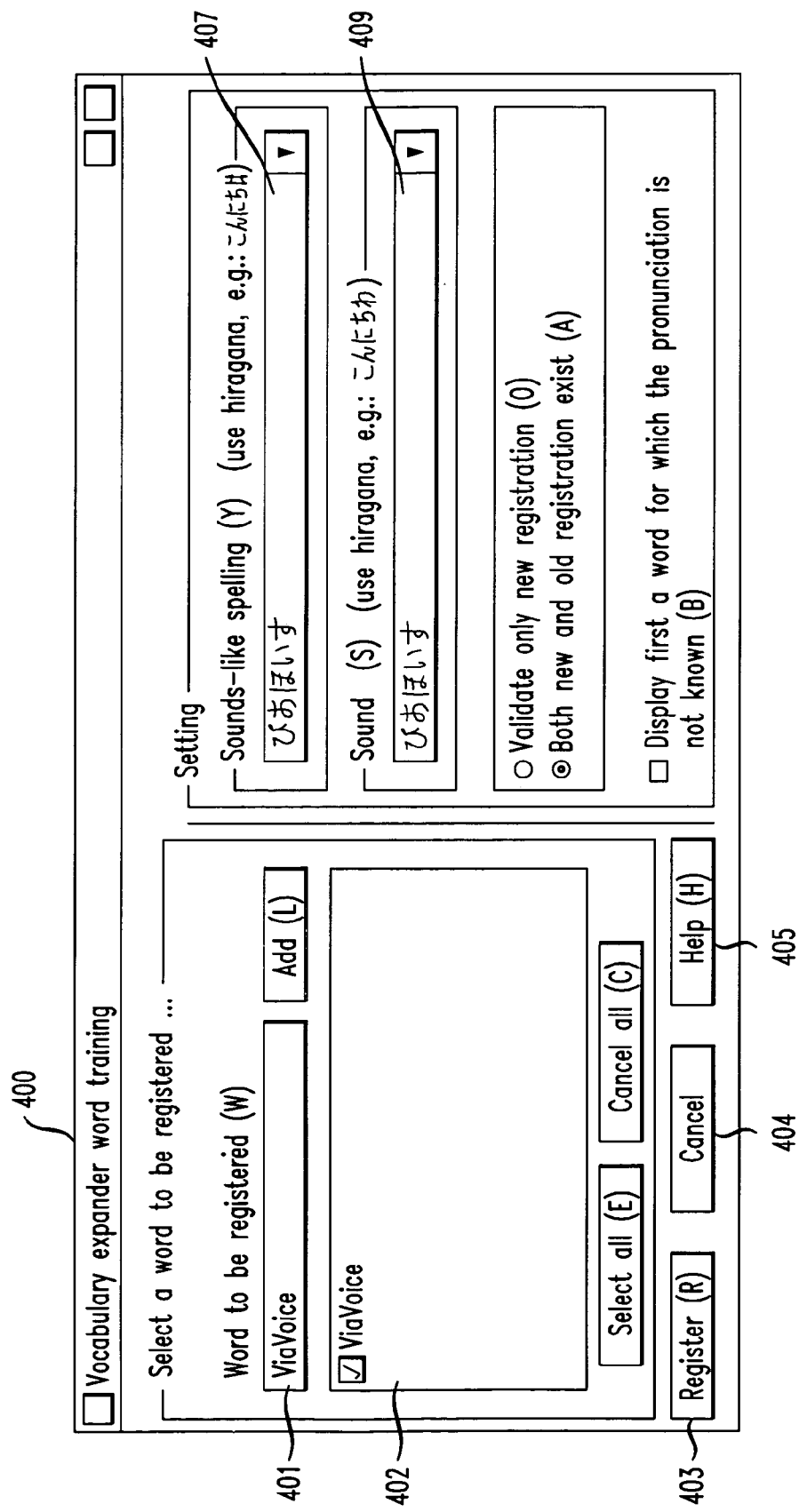
FIG. 8 is a conceptual diagram showing the user interface of a recognized word registration unit according to an embodiment of the present invention.
Figure 9:
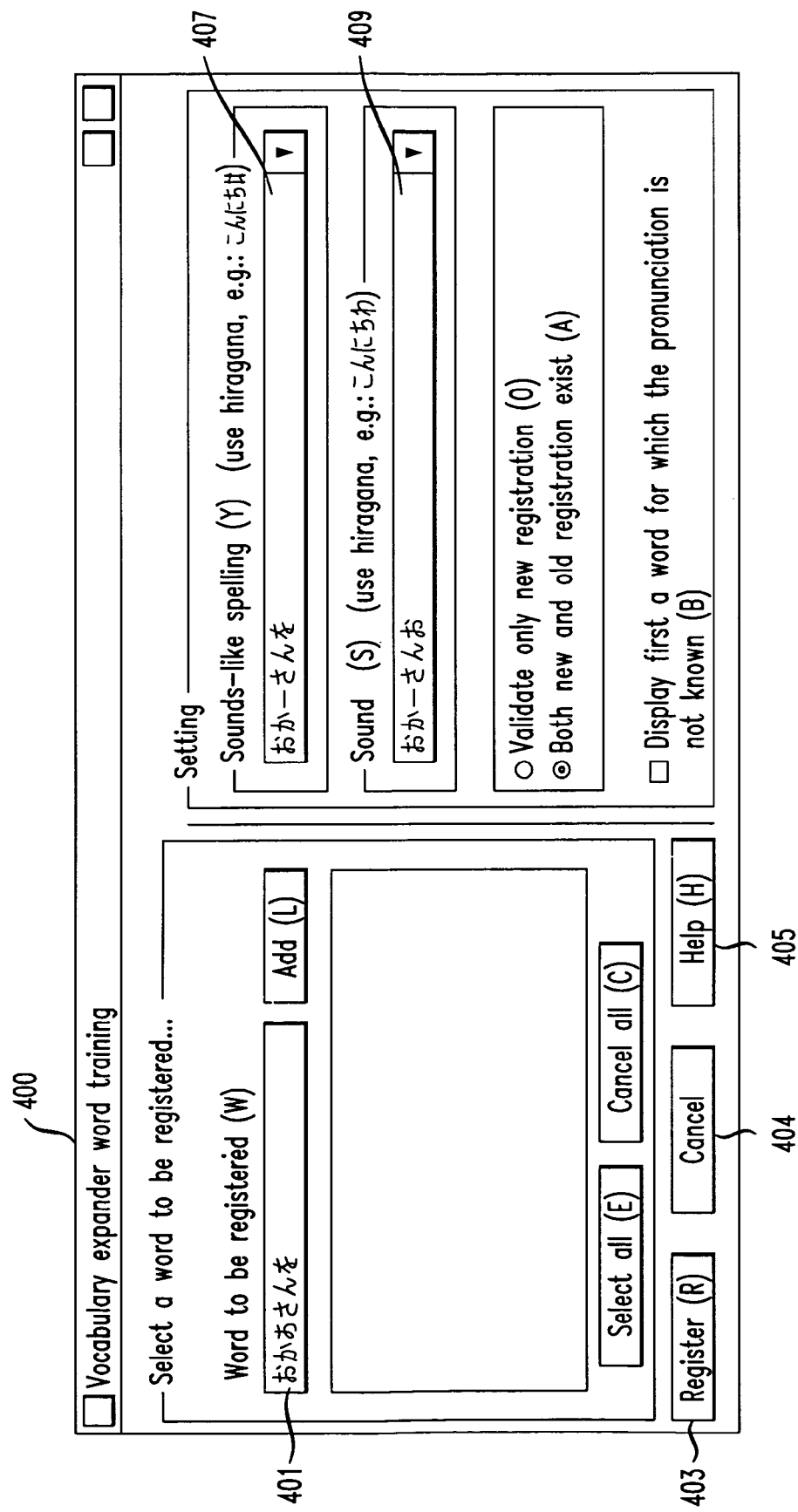
FIG. 9 is a conceptual diagram showing the user interface of the recognized word registration unit according to an embodiment of the present invention.
Figure 10:
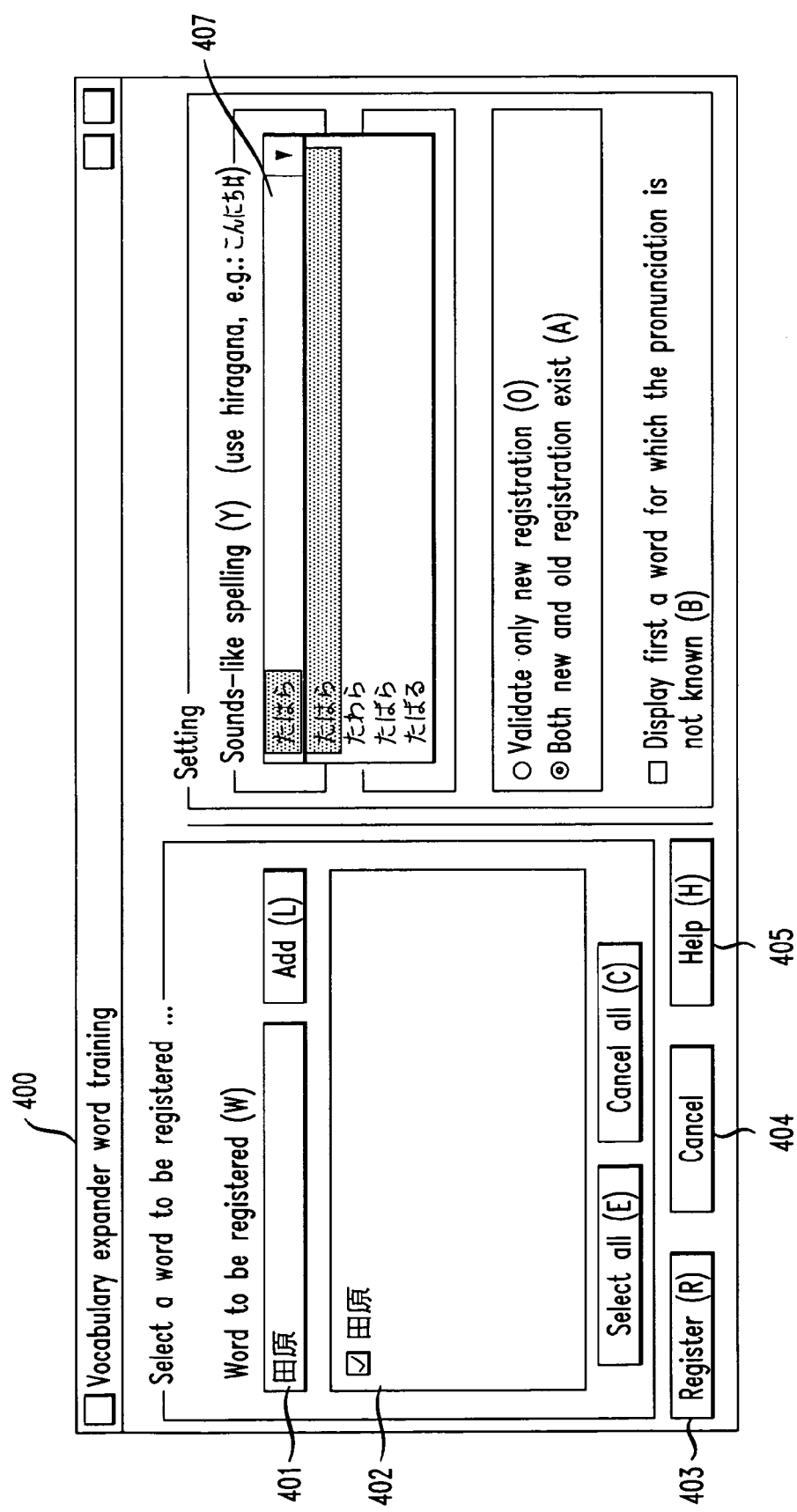
FIG. 10 is a conceptual diagram showing the user interface of the recognized word registration unit according to an embodiment of the present invention.

The recognized word registration processing for this embodiment will now be described while referring to FIG. 7. It is to be appreciated that FIGS. 8, 9 and 10 illustrate the user interface of a recognized word registration unit according to an embodiment of the present invention. As is shown in FIG. 7 in the user interface of the recognized word registration unit 201 for this embodiment, the recognized word registration unit 201 obtains in the word registration field 401 the inscription of a word that a user desires to enter (step 453).

The input word inscription is then transmitted to the sounds-like spelling generator 205, which thereafter conducts a search of the word dictionary 233 (step 455). The sounds-like spelling generator 205 obtains the sounds-like spelling 303, the pronunciation inscription 305 and the sounds-like spelling score 307 that correspond to the word inscription (step 457). When a predetermined condition is matched, the obtained sounds-like spelling score 307 can be corrected using the logic of the sounds-like spelling generator 205.

When, for example, the inscription consists of only kana characters and no sound is definitely prolonged, the sounds-like spelling score is corrected to 1. Further, even when a word that matches the inscription is present in the dictionary, if the speech recognition accuracy level of the dictionary is not high (e.g., when a dictionary used for kanji conversion is employed), and if the sound may be prolonged, the sounds-like spelling score is lowered.

The sounds-like spelling, the pronunciation inscription and the sounds-like spelling score are returned by the sounds-like spelling generator 205 to the recognized word registration unit 201, which subsequently determines whether a sounds-like spelling choice has been generated (step 459). When a sounds-like spelling choice has not been generated, the recognized word registration unit 201 outputs a message requesting that the user enter the sounds-like spelling, and acquires the sounds-like spelling 407 and the pronunciation inscription 409 that are input (step 461). FIG. 9 is a diagram showing the state wherein the user has used the keyboard to enter data in the fields 407 and 409.

When a sounds-like spelling choice is generated, the sounds-like spelling having the highest score is displayed in the sounds-like spelling field 407, and its pronunciation inscription is displayed in the pronunciation inscription field 409. In addition, as is shown in FIG. 10, the user is permitted to select a sounds-like spelling from among a number displayed on a pull-down menu in the order that corresponds to their scores (step 463).

The user confirms the sounds-like spelling currently displayed in the sounds-like spelling field 407 and the pronunciation inscription currently displayed in the pronunciation inscription field 409. If these are not correct, the user selects other display entries or uses the keyboard to correct the current entries.

When the user depresses a "register word" button 403 while the correct sounds-like spelling and the correct pronunciation inscription are shown in the fields 407 and 409 in a registered word recognition panel 400, the recognized word registration unit 201 obtains a set consisting of the word inscription 401, the sounds-like spelling 407 and the pronunciation inscription 409, and transmits this set to the base form generator 207. If the input sounds-like spelling is inappropriate, a message is output requesting that the user correct the input.

Based on the information set, the base form generator 207 conducts a search of the pronunciation dictionary 235, and obtains corresponding base forms and pronunciation scores. In this embodiment, the word inscription and the pronunciation inscription are employed to correct the pronunciation score.

Among the base forms that are obtained (step 465), one for which the score exceeds a predetermined threshold value is registered in the speech recognition dictionary with its inscription and its sounds-like spelling (step 467). In this manner, a new word can be registered in the speech recognition dictionary, without a recording of a user's voice being required.

E. Speech Recognition Processing

Figure 11:
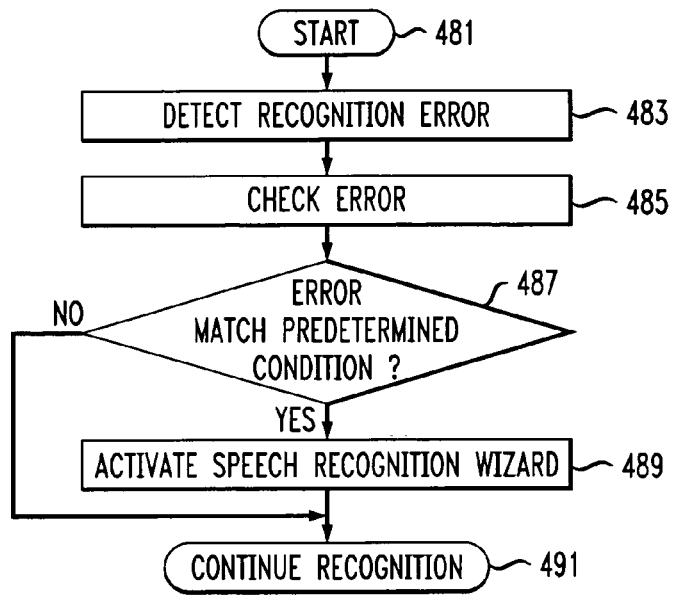
FIG. 11 is a flowchart showing the speech recognition processing performed for the embodiment of an present invention.

The speech recognition processing for this embodiment will now be described while referring to FIG. 11. First, the speech recognition engine 203 is activated by a user and then the voice input unit 209 is employed by the user to enter voice generated information. The speech recognition engine 203 employs the speech recognition dictionary 231 and a well known speech recognition method to identify the voice information that was input, and then outputs text data.

In the speech recognition process, when the speech recognition engine 203 detects a predetermined error (step 483), a check is performed to determine whether the error matches a predetermined condition (steps 485 and 487). The predetermined condition can be, for example:

1. the rejection of the base form because it has a low score (e.g., it can be rejected three times);
2. the repetition of a correction for the same word a plurality of times (e.g., twice);
3. the repetition of an erroneous recognition a plurality of times (e.g., three times).

In such a case, a method can be employed for providing an error counter for each word for which errors are detected and for counting the errors.

When the error matches the condition, the speech recognition engine 203 activates the speech recognition wizard 211, and halts the process until the use of the speech recognition wizard 211 has been terminated (step 489).

Figure 12:
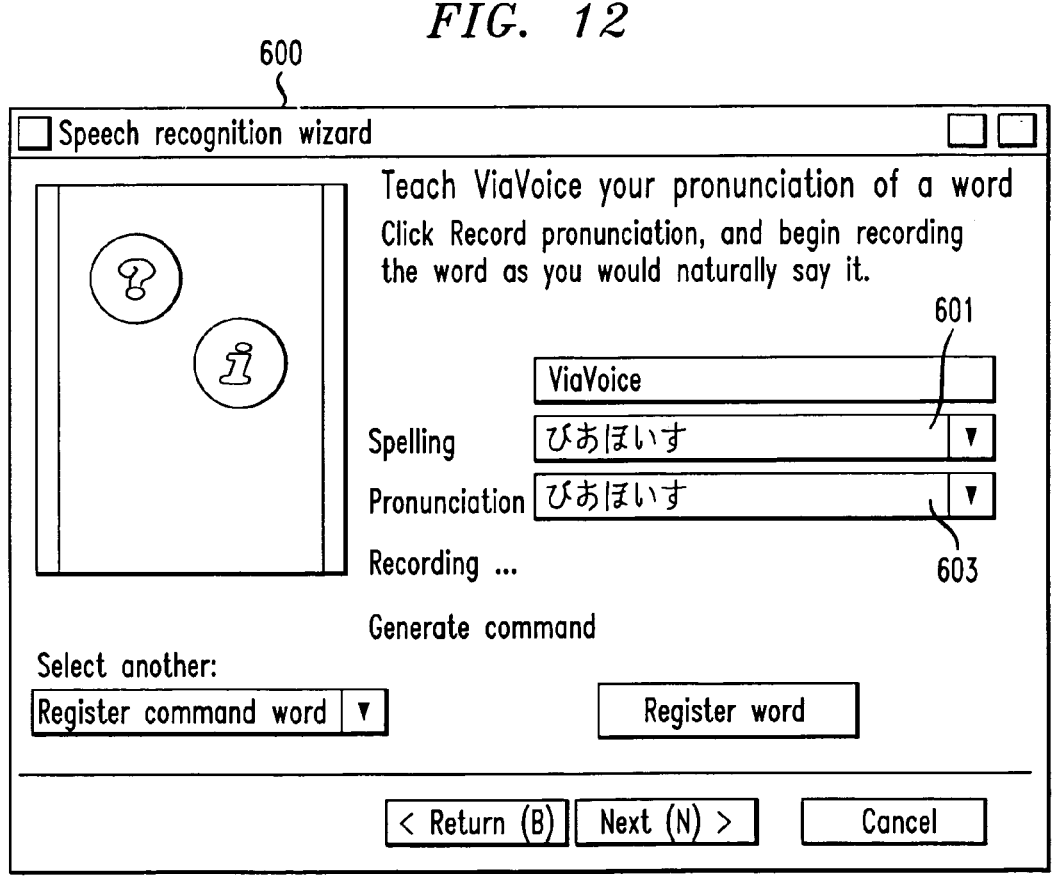
FIG. 12 is a conceptual diagram showing the user interface of a speech recognition wizard for an embodiment of the present invention.
Figure 13:
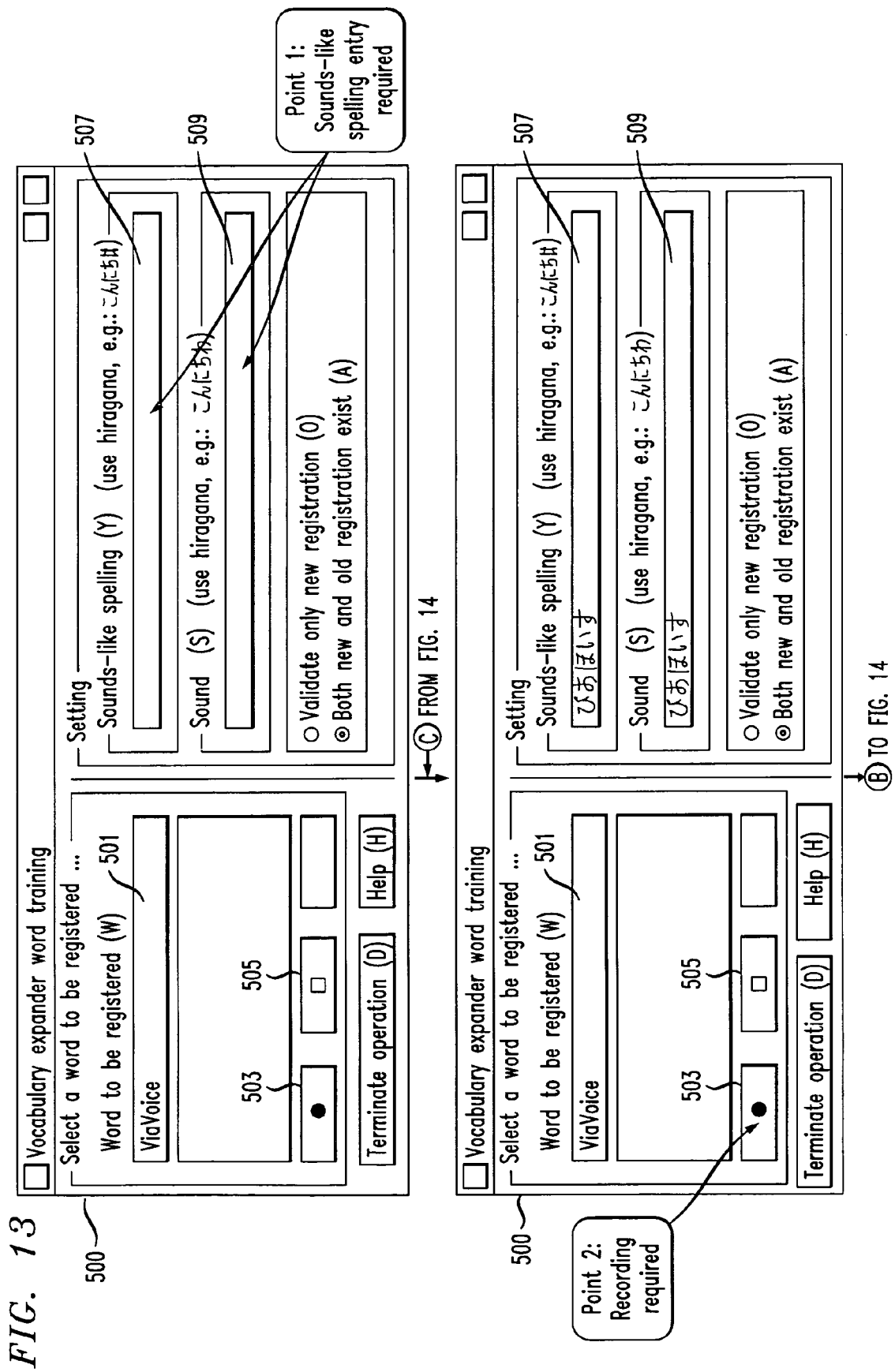
FIG. 13 is a conceptual diagram for explaining the outline of the conventional recognized word registration processing.
Figure 14:
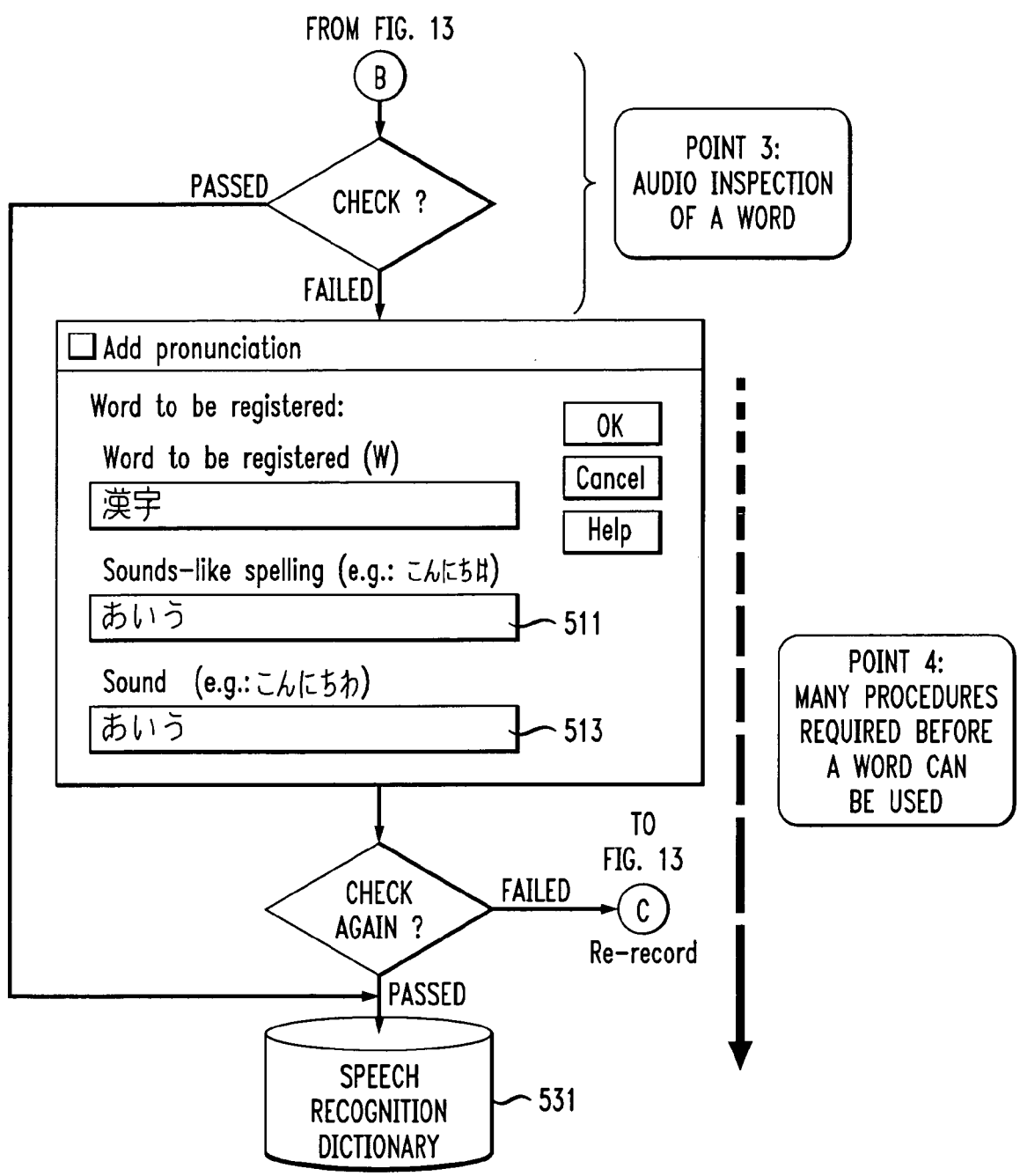
FIG. 14 is a conceptual diagram for explaining the outline of the conventional recognized word registration processing.

The speech recognition wizard 211 can select a base form corresponding to a recognized word in the same manner as that employed for the conventional recognized word registration method explained while referring to FIGS. 13 and 14. FIG. 12 is a conceptual diagram illustrating the user interface of the speech recognition wizard 211 in this embodiment. As is shown in FIG. 12, a user enters a sounds-like spelling and a pronunciation inscription in a sounds-like spelling field 601 and a pronunciation inscription field 603 provided on the speech recognition wizard 211. When the user then depresses a record button (not shown: when the record button is depressed, it disappears, and a message, "recording," is displayed) and voices the word, voice information is obtained and the fluctuation of the voice of the user is reflected in the base form. As a result, the word can be registered in the speech recognition dictionary, and can be employed later for speech recognition.

As is described above, even with the method of the present invention, cases exist where the recording of voices must finally be performed. Such a case may be one where a speaker has a local dialect, or where a speaker uses a pronunciation that is far from standard. In most cases, however, a user can register a word and terminate the processing without having to make a voice recording. Compared with the conventional registration method for which a voice recording is required, the method of the present invention can considerably reduce the amount of work required of a user. Furthermore, when a recognition error is detected, the user is automatically requested to record his or her voice, so that a reduction in the recognition accuracy can be avoided.

In the above description, Japanese is employed for better understanding; however, application of the present invention is not limited to Japanese, and basically it can be used for all languages. This is possible because to employ the present invention for another language, all that is required is an appropriate sounds-like spelling generator, base form generator and speech recognition engine that have been prepared for the target language.

In this case, a standardized sounds-like spelling inscription system used for an individual country must be employed; for example, "hiragana" for Japanese, Pinyin for Chinese, JuYin for Formosan, and Hangul for Korean. Since a common sounds-like spelling inscription system is not employed for European languages other than English, however, when the present invention is applied for such European languages it must be so modified that it can deal with the inconsistencies in the sounds-like spelling inscription systems.

As is described above, according to the present invention, speech recognition accuracy can be maintained while reducing, to the greatest extent possible, the work associated with the recording of a user's voice.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A recognized word registration method, for a speech recognition apparatus that includes a display screen and a voice input device, comprising the steps of:
    obtaining a word inscription specified by a user;
    searching a word dictionary to obtain a sounds-like spelling corresponding to said word inscription;
    searching a pronunciation dictionary to obtain a base form corresponding to said sounds-like spelling that has been obtained; and
    registering said base form in a speech recognition dictionary.

2. A recognized word registration method, for a speech recognition apparatus that includes a display screen and a voice input device, comprising the steps of:
    obtaining a word inscription specified by a user;
    searching a word dictionary to obtain a plurality of sounds-like spellings that correspond to said word inscription and sounds-like spelling scores that correspond to said sounds-like spellings;
    displaying said plurality of sounds-like spellings for said user;
    obtaining said sounds-like spelling that is selected by said user from among said plurality of sounds-like spellings;
    searching a pronunciation dictionary to obtain a base form and a pronunciation score corresponding to said sounds-like spelling that has been obtained;
    determining whether said pronunciation score exceeds a predetermined threshold value; and
    registering said base form in a speech recognition dictionary when said pronunciation score exceeds said predetermined threshold value.

3. A recognized word registration method, for a speech recognition apparatus that includes a display screen and a voice input device, comprising the steps of:
    determining whether first voice information obtained for a user's voice matches a predetermined condition;
    displaying on said display screen, when said voice information matches said predetermined condition, a speech recognition wizard panel that includes a new word input field and a sounds-like spelling input field;
    obtaining a new word and a sounds-like spelling that are entered in said speech recognition wizard panel;
    obtaining second voice information based on said user's pronunciation provided for said new word and said sounds-like spelling;
    employing said second voice information, said new word and said sounds-like spelling to specifically describe a base form; and
    adding said base form to a speech recognition dictionary.

4. A recognized word registration method, for a speech recognition apparatus that includes a display screen and a voice input device, comprising:
    an initial registration step, including:
    obtaining a word inscription specified by a user,
    searching a word dictionary to obtain a plurality of sounds-like spellings that correspond to said word inscription and sounds-like spelling scores that correspond to said sounds-like spellings,
    displaying said plurality of sounds-like spellings for said user, obtaining said sounds-like spelling that is selected by said user from among said plurality of sounds-like spellings,
    searching a pronunciation dictionary to obtain a base form and a pronunciation score corresponding to said sounds-like spelling that has been obtained,
    determining whether said pronunciation score exceeds a predetermined threshold value, and
    registering said base form in a speech recognition dictionary when said pronunciation score exceeds said predetermined threshold value, and
    a registration step at the speech recognition time, including:
    determining whether first voice information obtained for a user's voice matches a predetermined condition,
    displaying on said display screen, when said voice information matches said predetermined condition, a speech recognition wizard panel that includes a new word input field and a sounds-like spelling input field,
    obtaining a new word and a sounds-like spelling that are entered in said speech recognition wizard panel,
    obtaining second voice information based on said user's pronunciation provided for said new word and said sounds-like spelling,
    employing said second voice information, said new word and said sounds-like spelling to specifically describe a second base form, and
    adding said second base form to a speech recognition dictionary.

5. A speech recognition apparatus, which includes a display screen and a voice input device, comprising:
    a recognized word registration unit for obtaining a word inscription specified by a user;
    a sounds-like spelling generator for searching a word dictionary to obtain a sounds-like spelling corresponding to said word inscription;
    a base form generator for searching a pronunciation dictionary to obtain a base form corresponding to said sounds-like spelling that has been obtained; and
    a speech recognition dictionary in which said base form is registered.

6. A speech recognition apparatus, which includes a display screen and a voice input device, comprising:
    a recognized word registration unit for obtaining a word inscription specified by a user;
    a sounds-like spelling generator for searching a word dictionary to obtain a plurality of sounds-like spellings that correspond to said word inscription and sounds-like spelling scores that correspond to said sounds-like spellings, and for obtaining said sounds-like spelling that is selected by said user from among said plurality of sounds-like spellings on said display screen;
    a base form generator for searching a pronunciation dictionary to obtain a base form and a pronunciation score corresponding to said sounds-like spelling that has been obtained; and
    a speech recognition dictionary in which said base form is registered when said pronunciation score exceeds a predetermined threshold value.

7. A speech recognition apparatus, which includes a display screen and a voice input device, comprising:
    a recognized word registration unit for determining whether first voice information obtained for a user's voice matches a predetermined condition;
    a speech recognition wizard for displaying on said display screen, when said voice information matches said predetermined condition, a speech recognition wizard panel that includes a new word input field and a sounds-like spelling input field;

a voice input unit for obtaining second voice information based on said user's pronunciation provided for a new word and a sounds-like spelling that are entered in said speech recognition wizard panel;

a base form generator for employing said second voice information, said new word and said sounds-like spelling to specifically describe a base form; and a speech recognition dictionary to which said base form is added.

8. A speech recognition apparatus comprising:

a display screen;

a voice input unit for entering voice information generated by a user's voice;

a speech recognition engine for recognizing said voice information;

a recognized word registration unit for obtaining a word inscription specified by a user;

a sounds-like spelling generator for searching a word dictionary to obtain a plurality of sounds-like spellings that correspond to said word inscription and sounds-like spelling scores that correspond to said sounds-like spellings, and for, when one of said plurality of sounds-like spellings is selected by said user, obtaining said sounds-like spelling that is selected;

a base form generator for searching a pronunciation dictionary to obtain a base form and a pronunciation score corresponding to said sounds-like spelling that has been obtained; and a speech recognition dictionary in which a base form is registered when said pronunciation score exceeds said predetermined threshold value;

wherein said speech recognition engine determines whether first voice information obtained for a user's voice matches a predetermined condition, and activates, when said voice information matches said predetermined condition, a speech recognition wizard panel that includes a new word input field and a sounds-like spelling input field;

wherein said sounds-like spelling generator obtains second voice information based on said user's pronunciation provided for a new word and a sounds-like spelling that are entered in said speech recognition wizard panel;

wherein said base form generator employs said second voice information, said new word and said sounds-like spelling to specifically describe a second base form; and wherein said second base form is stored in said speech recognition dictionary.

9. A storage medium on which is stored a recognized word registration program that is to be executed by a speech recognition apparatus that includes a display screen and a voice input device, said recognized word registration program comprising:

program code for instructing said speech recognition apparatus to obtain a word inscription specified by a user;

program code for instructing said speech recognition apparatus to search a word dictionary to obtain a sounds-like spelling corresponding to said word inscription;

program code for instructing said speech recognition apparatus to search a pronunciation dictionary to obtain a base form corresponding to said sounds-like spelling that has been obtained; and program code for instructing said speech recognition apparatus to register said base form in a speech recognition dictionary.

10. A storage medium on which is stored a recognized word registration program that is to be executed by a speech recognition apparatus that includes a display screen and a voice input device, said recognized word registration program comprising:

program code for instructing said speech recognition apparatus to obtain a word inscription specified by a user;

program code for instructing said speech recognition apparatus to search a word dictionary to obtain a plurality of sounds-like spellings that correspond to said word inscription and sounds-like spelling scores that correspond to said sounds-like spellings;

program code for instructing said speech recognition apparatus to display said plurality of sounds-like spellings for said user;

program code for instructing said speech recognition apparatus to obtain said sounds-like spelling that is selected by said user from among said plurality of sounds-like spellings;

program code for instructing said speech recognition apparatus to search a pronunciation dictionary to obtain abase form and a pronunciation score corresponding to said sounds-like spelling that has been obtained;

program code for instructing said speech recognition apparatus to determine whether said pronunciation score exceeds a predetermined threshold value; and program code for instructing said speech recognition apparatus to register said base form in a speech recognition dictionary when said pronunciation score exceeds said predetermined threshold value.

11. A storage medium on which is stored a speech recognition process program that is to be executed by a speech recognition apparatus that includes a display screen and a voice input device, said speech recognition process program comprising:

program code for instructing said speech recognition apparatus to determine whether first voice information obtained for a user's voice matches a predetermined condition;

program code for instructing said speech recognition apparatus to display on said display screen, when said voice information matches said predetermined condition, a speech recognition wizard panel that includes a new word input field and a sounds-like spelling input field;

program code for instructing said speech recognition apparatus to obtain a new word and a sounds-like spelling that are entered in said speech recognition wizard panel;

program code for instructing said speech recognition apparatus to obtain second voice information based on said user's pronunciation provided for said new word and said sounds-like spelling;

program code for instructing said speech recognition apparatus to employ said second voice information, said new word and said sounds-like spelling to specifically describe a base form; and program code for instructing said speech recognition apparatus to add said base form to a speech recognition dictionary.

12. A storage medium on which is stored a speech recognition process program that is to be executed by a speech recognition apparatus that includes a display screen and a voice input device, said speech recognition process program comprising:

- program code for instructing said speech recognition apparatus to obtain a word inscription specified by a user;
- program code for instructing said speech recognition apparatus to search a word dictionary to obtain a plurality of sounds-like spellings that correspond to said word inscription and sounds-like spelling scores that correspond to said sounds-like spellings;
- program code for instructing said speech recognition apparatus to display said plurality of sounds-like spellings for said user;
- program code for instructing said speech recognition apparatus to obtain said sounds-like spelling that is selected by said user from among said plurality of sounds-like spellings;
- program code for instructing said speech recognition apparatus to search a pronunciation dictionary to obtain a base form and a pronunciation score corresponding to said sounds-like spelling that has been obtained;
- program code for instructing said speech recognition apparatus to determine whether said pronunciation score exceeds a predetermined threshold value;
- program code for instructing said speech recognition apparatus to register said base form in a speech recognition dictionary when said pronunciation score exceeds said predetermined threshold value;
- program code for instructing said speech recognition apparatus to determine whether first voice information obtained for a user's voice matches a predetermined condition;
- program code for instructing said speech recognition apparatus to display on said display screen, when said voice information matches said predetermined condition, a speech recognition wizard panel that includes a new word input field and a sounds-like spelling input field;
- program code for instructing said speech recognition apparatus to obtain a new word and a sounds-like spelling that are entered in said speech recognition wizard panel;
- program code for instructing said speech recognition apparatus to obtain second voice information based on said user's pronunciation provided for said new word and said sounds-like spelling;
- program code for instructing said speech recognition apparatus to employ said second voice information, said new word and said sounds-like spelling to specifically describe a second base form; and
- program code for instructing said speech recognition apparatus to add said second base form to a speech recognition dictionary.

* * * * *